Feb. 21, 1928.
A. H. GIBSON
JAR HANDLING DEVICE
Filed Aug. 9, 1926
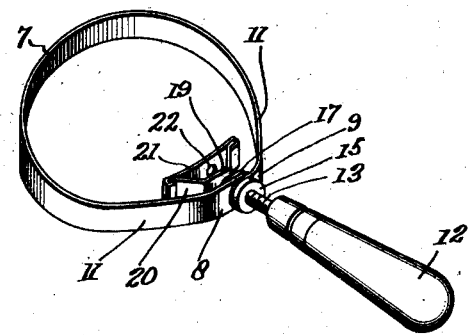
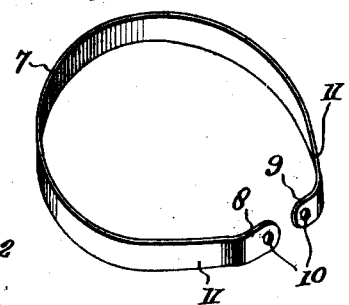
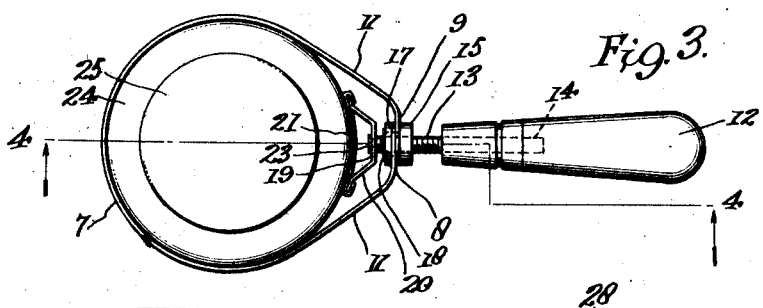
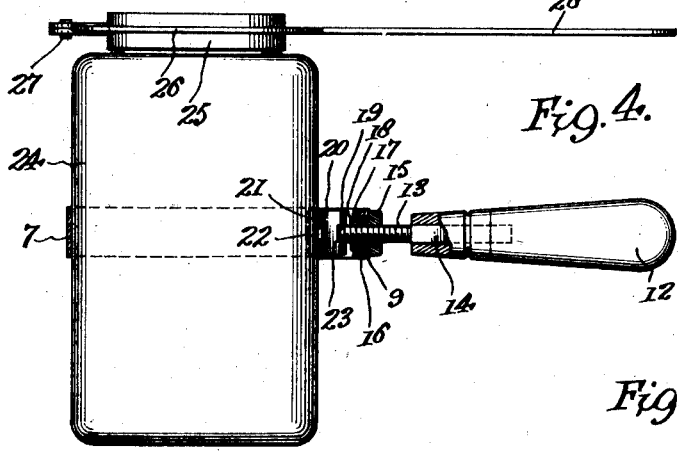
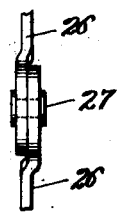
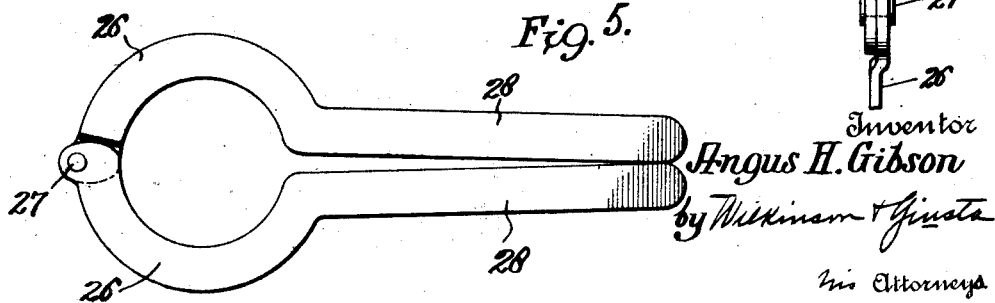
Inventor
Angus H. Gibson Patented Feb. 21, 1928.

1,659,599

UNITED STATES PATENT OFFICE.

ANGUS H. GIBSON, OF SALT LAKE CITY, UTAH, ASSIGNOR, BY MESNE ASSIGNMENTS, TO W. H. PENNER, OF SALT LAKE CITY, UTAH.

JAR-HANDLING DEVICE.

Application filed August 9, 1926. Serial No. 128,227.

This invention relates to jar handling devices.

Although the improvements more particularly embody a novel form of carrier-holding device for clasping the body of a heated jar or the like, for more satisfactorily manipulating the same in movements from one place to another, still the device is not necessarily restricted to that particular usage and may be employed in various other relations, such as for holding the jar steady when used in conjunction with a suitable wrench-like implement as applied to the screw cap of the container vessel, whether hot or cold, to tighten and loosen said cap, in sealing and unsealing relation, while the container is firmly held by said carrier-holding device. In fact, one of these carrier-holding devices might well be employed of itself as a jar cap wrench, although I have illustrated and will hereinafter only describe a more simple form of a jar cap wrench.

It is understood that in preserving or canning fruits or vegetables or other food stuffs, as well as when boiling out or scalding their containers, preparatory to such use, and also in cooking or heating certain of them preparatory to serving, it is quite customary to place the glass jars or the like in boiling water, which heats them to such a degree as to make them extremely uncomfortable to handle, especially if there are a large number of them to be handled. Also, there oftentimes results the serious burning or scalding of the hands, in such manipulations, and not infrequently the breaking of said containers, by dropping them owing to said heat, especially when carrying them from the stove to the table or other support where the caps are applied.

The primary object of my invention, therefore, has been to devise economical and satisfactory means for safely handling and manipulating said jars or the like, when so heated up, both when lifting them from said boiling water and carrying them therefrom for sealing, etc., as well as to hold a jar firmly when said wrench is applied to the jar cap, for turning the latter in either direction; and as the clasping device will hold the jar in carrying relation, I have referred to the same as a carrier-holding device.

Other objects and advantages reside in the details of construction and functioning, all of which will more clearly appear as incidental to the following disclosure, and with these general outlining remarks, therefore, reference will now be immediately had to the accompanying drawings, illustrating a practical embodiment of the improvements, in which drawings Figure 1 is a perspective view of the assembled holding device; Figure 2 is a perspective view of the clamping band thereof; Figure 3 is a top plan view of the holding device, as applied to a fruit jar or the like; Figure 4 is an elevational view of Figure 3, a part of the holding device being broken away along the section line 4—4 of Figure 3, and the said wrench implement being shown applied to the cap of the jar; Figure 5 is a plan view of said wrench implement as detached; and Figure 6 is a fragmentary end edge view of the pivotal end of the wrench.

Broadly, the carrier-holding device embodies a clamping band or strap element, of relatively large diameter to freely encompass the body of the container vessel, which strap band is supported by a handle element that is provided with adjustable means for causing the band to be tightly clamped around the jar.

This strap band is indicated at 7 in the drawings, being formed of a freely flexing inextensible material, such as a thin resilient strap and preferably a light springy metal band, illustrated as a split band having slightly convergent arms 11, to provide a clearance space for an adjustable member later referred to, and said convergent arms terminating in contiguously associated laterally bent arms 8 and 9 that are provided with apertures 10 adapted for registration.

The supporting handle is indicated at 12 and is provided with a screw-threaded projection 13, which may have a squared portion 14 for tight fitting within the handle, and the said threaded portion 13 being adapted to mount an adjustable disk head or collar 15, provided with a short tubular shank or neck 16, in threaded relation with said screw portion 13.

A locking washer 17 encompasses said shank 16 in slightly spaced association with its collar head 15, for clamping together the bent arms 8—9 which, in assembling the device, are fitted over the screw 13 by virtue of the apertures 10.

In the illustration, the end of the tubular shank is shown, at 18, as being peened over upon the washer 17, but obviously the exterior periphery of the shank could be threaded and the washer also threaded to provide for a threaded adjustment of the latter relatively to the collar 15 and the interposed band ends 8—9. In the latter event, the apertures 10 might well be in the form of slots open at one end, to permit of the ready detachment and attachment of the band if desired.

On the outer end of the screw 13 there is carried a shoe-like abutment, shown as swiveled thereon and solely supported thereby, and accordingly this abutment shoe is only indirectly supported by the band, if it may be said to be supported thereby at all, by virtue of the screw end and band clamping elements, and at but a sole position of the periphery of the band. Being so mounted, this abutment shoe is bodily contained wholly within and relatively unattached to said band, and is adjustable radially thereof, in such said wholly contained and relatively detached relation, upon turning the handle in either direction, in a rotatable manner, when the band and clamping elements 15—17 are held against rotation.

This abutment shoe could be of other form and material than exactly as shown, but is preferably made hollow and of light springy metal, to provide for a slight resilient give, in order that it may be made to engage the jar without too harsh a pressure.

To this end, the shoe may be formed of a frame-like support, comprising a base section 19 with divergent arms 20, the latter being joined at their outer ends by an arcuate subtending arm or section 21 for frictional gripping engagement with the body of the jar. The base section 19 is provided with an aperture for rotatably encompassing the slightly reduced end of the screw 13, and the subtending section 21 may be provided with a central aperture 22, to allow for the insertion of a punch for peening over the end of the screw as indicated at 23.

The body of the vessel container or jar is indicated by the numeral 24, and the screw-threaded cap therefor is indicated by the numeral 25.

The wrench implement for turning the cap of the jar, as hereinbefore referred to, may simply consist of a pair of substantially semi-circular gripping sections 26, pivoted together at one end, as by means of a pivot pin 27, and at their other ends extending as a pair of handle sections 28.

From the drawings and foregoing description it will be apparent that, in applying the carrier-holding device to a jar, the shoe abutment is initially disposed in a retracted position, in order that the band 7 may be facilely fitted loosely around the jar body, whereupon, by rotating the handle 12, in the appropriate direction, the screw 13 will be threaded inwardly through the collar 15 and its hollow shank 16, causing the shoe abutment to be moved radially towards the jar body.

As the arcuate member 23, of the shoe abutment, engages the jar body, the arms 8—9 of the band are forced away from the jar body, thus tautening the band 7 and causing the jar to be gripped firmly, but not too harshly, between the flexible clamping band 7 and the resilient arcuate member 21 of the radially adjustable shoe abutment. The reverse operation for detaching the holding device will be obvious.

When the carrier-holding device is thus attached to the jar body, the jar may readily be lifted out of the hot water and removed to a table or other support for fitting its cap closure thereto, which latter may be the more facilely accomplished, while the jar is thus held, by applying the wrench implement 26—28, as shown at Figure 4, and which also will be obvious.

While I have thus fully illustrated and described my invention, it will nevertheless be understood that I do not wish to unnecessarily restrict myself to all of the details exactly as disclosed, excepting as they may come within the terms of the ensuing claims, or their equivalent, or as fairly interpreted in the light of the specification if necessary.

What I do claim, as new and patentable, is:—

1. In a device of the character disclosed, the combination of a split band having apertured ends, a relatively small two-part handle attaching clamping unit securing together the ends of said band, which clamping unit is provided with a threaded bore disposed radially of said band and in registration with the end apertures thereof, a handle for manually supporting the device having an end screw threading through said bore to project within said band, and an abutment shoe so carried on the projected end of said screw as to be bodily contained wholly within and in disconnected relation with said band proper.

2. In a device of the character disclosed, the combination of a band, a handle attaching element carried by said band at a sole position thereof, which element is provided with a threaded bore disposed radially of and in communication with the interior of said band, a handle for manually supporting the device having an end screw threading through said bore to project within said band, and an open frame-like abutment shoe so mounted on the projected end of said screw as to be bodily contained wholly within and in disconnected relation with said band proper, the said shoe embodying divergent side arms subtended by an arcuate resilient jar part engaging member.

In testimony whereof, I affix my signature.

ANGUS H. GIBSON.